United States Patent [19]
Marshall et al.

[11] Patent Number: 5,267,118
[45] Date of Patent: Nov. 30, 1993

[54] METHOD AND APPARATUS FOR THERMALLY SEPARATING DEVICES ON A POWER INTEGRATED CIRCUIT

[75] Inventors: Andrew Marshall; Kenneth G. Buss, both of Dallas; David R. Cotton, Plano, all of Tex.

[73] Assignee: Texas Instruments Incorporated, Dallas, Tex.

[21] Appl. No.: 843,701

[22] Filed: Feb. 28, 1992

[51] Int. Cl.$^5$ .............................................. H02H 5/04
[52] U.S. Cl. ........................................ 361/103; 361/78
[58] Field of Search ................... 361/28, 103, 106, 28; 307/117; 323/907

[56] References Cited
U.S. PATENT DOCUMENTS

| | | | |
|---|---|---|---|
| 4,092,693 | 5/1978 | Ishikawa et al. | 361/103 |
| 5,159,520 | 10/1992 | Toyooka et al. | 361/103 |
| 5,206,778 | 4/1993 | Flynn et al. | 361/103 |

Primary Examiner—Todd E. DeBoer
Attorney, Agent, or Firm—Stanton C. Braden; Richard L. Donaldson

[57] ABSTRACT

Circuitry (46, or 28 and 70) for thermally separating a power integrated circuit device (12) from a plurality of other such devices (14, 16, and 18) on a common power integrated circuit chip (10) operate when the device (12) reaches a thermal shutdown temperature setpoint (56) with an output current at a predetermined current limit (54). The circuitry 46, or 28 and 70 switches the output current to a shutdown current level (57) until the device (12) reaches a predetermined lower temperature setpoint (58). Circuitry (46, or 28 and 70) restores the output current level to the predetermined current limit only after the device (12) reaches both the predetermined lower temperature setpoint (58) and a predetermined circuit setpoint (62 or 74). The circuit setpoint (62 or 74) associates with the temperature of the device (12) and may be either a yet lower temperature setpoint (62) or a specified time delay (74). The above steps are repeated to lower the average temperature of the device (12) and thereby thermally separate the device (12) from the other of such devices (14, 16 and 18) on the common power integrated circuit chip (10).

25 Claims, 3 Drawing Sheets

METHOD AND APPARATUS FOR THERMALLY SEPARATING DEVICES ON A POWER INTEGRATED CIRCUIT

TECHNICAL FIELD OF THE INVENTION

The present invention generally relates to the field of electronic circuits, and more particularly to a method and apparatus for thermally separating a power integrated circuit device from a plurality of other such devices on a common power integrated circuit chip.

BACKGROUND OF THE INVENTION

Power integrated circuits (PICs) carry current, typically DC current, to electric motors, lamps, and other devices that use electric power. More sophisticated PICs use multiple output PIC devices on a single PIC chip. These PIC devices produce heat as they provide power to various PIC loads.

In some instances, such as in a short-circuit condition, PIC devices may reach excessive temperatures that, if not limited, can damage the entire PIC chip. To address this problem, many PICs devices include thermal shutdown circuitry to cause the PIC device to shutdown when it reaches a thermal shutdown temperature setpoint. After shutting down, the PIC device may execute a hysteresis program to oscillate in temperature between the thermal shutdown temperature setpoint and a lower temperature setpoint. Thus, when thermal shutdown of the PIC device occurs, the current through that device switches to a shutdown current level, which may be zero current, to permit the device to cool to the lower temperature setpoint. Once the device reaches the lower temperature setpoint, circuitry may restore PIC device output current until the device again reaches the thermal shutdown temperature setpoint. This PIC device current-temperature hysteresis will continue until conditions exist that may cause it to stop.

Because a PIC chip often contains multiple outputs that radiate heat to the chip, it may be difficult to thermally separate the PIC devices from one another. For example, the heat that one output generates may affect the operation of other outputs. If one of the PIC outputs operate within the above-described current-temperature hysteresis, the average temperature of the oscillating PIC output may increase the temperature of adjacent outputs on the PIC chip to make them also execute their own current-temperature hysteresis.

Seeking to overcome this problem, some PIC chips separate the thermal shutdown circuits of the PIC devices as physically far as possible from the other thermal shutdown circuits on the chip on the PIC chip. This, to some degree, thermally separates the temperature sensing of the PIC outputs. However, separating the thermal sense circuits does not eliminate the thermal effects of an overheating PIC output from other properly operating PIC outputs on the common PIC chip.

The thermal separation problem may be seen in the following example. Suppose that a PIC output operates within a current-temperature hysteresis. If the thermal shutdown temperature setpoint is 150° C. and the lower temperature setpoint for restoring current through the PIC device is 130° C., an average PIC device temperature while performing the hysteresis may be 140° C. Poor heating-sinking capability in the PIC chip may cause adjacent PIC outputs to experience temperatures as high as 100° C., for example, from the failing PIC output. If the normal operating temperature of the adjacent output devices on the PIC chip approximates 70° above ambient, for example, then the addition of the radiated 100° C. from the over-heated PIC chip may cause the otherwise normally operating PIC device to experience temperature of approximately 170°. This will cause the properly operating PIC device to activate its thermal shutdown circuitry.

An even more serious problem is observable in the following example. A short-circuited condition may exist in a PIC device that does not cause the PIC device to reach the 150° C. thermal shutdown temperature setpoint. For example, the temperature in the short-circuited PIC device may reach 148° C., but no higher. This temperature will cause the short-circuited PIC device not to execute the current-temperature hysteresis. From this high temperature an adjacent PIC device may still receive as much as 100° C. of temperature through poor heat-sinking of the PIC chip. When added with the normal 70° C. operating temperature of a properly operating PIC device, the total temperature may cause the normally operating PIC device to itself reach the thermal shutdown situation. This, again, will cause the normally-operating PIC device to undergo the hysteresis and indicate a failure mode. Thus, with a high average temperature from the failing PIC output, a non-failing PIC output may improperly indicate a failure condition.

As a result of the above problems, there is a need for a method and apparatus that improves the thermal independence between outputs of a multi-output power integrated circuit.

There is a need for a method and system that thermally separates a power integrated circuit device from a plurality of other such devices on a common PIC chip.

SUMMARY OF THE INVENTION

The present invention, accordingly, provides a method and apparatus for thermally separating a PIC device from a plurality of other PIC devices on a common PIC chip that overcomes or reduces disadvantages and limitations associated with prior PIC temperature and short-circuit responsive methods and apparatuses.

One aspect of the invention is a method for thermally separating a PIC device from a plurality of other of such PIC devices on a common PIC chip when the PIC device reaches a thermal shutdown setpoint with an output current at a predetermined current limit. The method comprises the steps of switching the output current to a shutdown current level until the device reaches a predetermined lower temperature setpoint. Once the device reaches the predetermined lower temperature setpoint, the method entails restoring the output current to the predetermined current limit only after the device (1) reaches the predetermined lower temperature setpoint, and (2) reaches a predetermined circuit setpoint.

The predetermined circuit setpoint is associated with the temperature of the device and causes the PIC device having a short-circuit condition to produce a lower average temperature during a hysteresis mode of operation. By reducing the average temperature of the device, a PIC device experiencing a short-circuit condition less severely affects the other PIC devices on the common PIC chip.

In a further aspect of the invention, the predetermined circuit setpoint is a yet lower temperature setpoint. When the PIC device reaches the first predetermined lower temperature setpoint after switching to the shutdown current level, the PIC device switches to produce a current sufficiently high to operate a normal load of the PIC device. This current is less than the output current limit at which the PIC device had previously been operating. While operating at the lower current level, the PIC device continues to cool until the PIC device reaches the yet lower temperature setpoint. When the PIC device reaches the yet lower temperature setpoint, output current then increases to the predetermined output current limit and the hysteresis begins again.

In yet another aspect of the present invention, the predetermined circuit setpoint is a time delay that permits further cooling of the short-circuited PIC device. The time delay is sufficiently long to permit a substantial, though not necessarily a specified, temperature reduction of the short-circuited PIC device. In other words, the point at which the PIC device resumes the output current limit is a function of a time delay, instead of a yet lower temperature. The result, however, is to reduce the average PIC device temperature below the average temperature occurring without the time delay.

A technical advantage of the present invention is that it improves thermal separation of PIC devices on a common PIC chip by reducing the average temperature of a PIC device operating in a current-temperature hysteresis mode of operation.

Another technical advantage of the present invention is that it thermally separates a short-circuited PIC device from other such devices on a common PIC chip with a minimal amount of additional circuitry.

BRIEF DESCRIPTION OF THE DRAWINGS

The invention and its modes of use and advantages are best understood by referring to the following description of illustrative embodiments when read conjunction with the accompanying drawings, wherein.

DETAILED DESCRIPTION OF THE INVENTION

The preferred embodiment of the present invention is best understood by referring to FIGUREs wherein like numerals are used for like and corresponding parts of the various drawings.

The trend to higher-current, multi-output power integrated circuits (PICs) having multiple PIC devices on a single chip causes a problem when the PIC devices must be thermally independent. When one PIC device goes into a thermal limit, it is necessary that the other PIC devices continue to function and that the thermally-limited PIC device not influence their operation.

Figure 1:
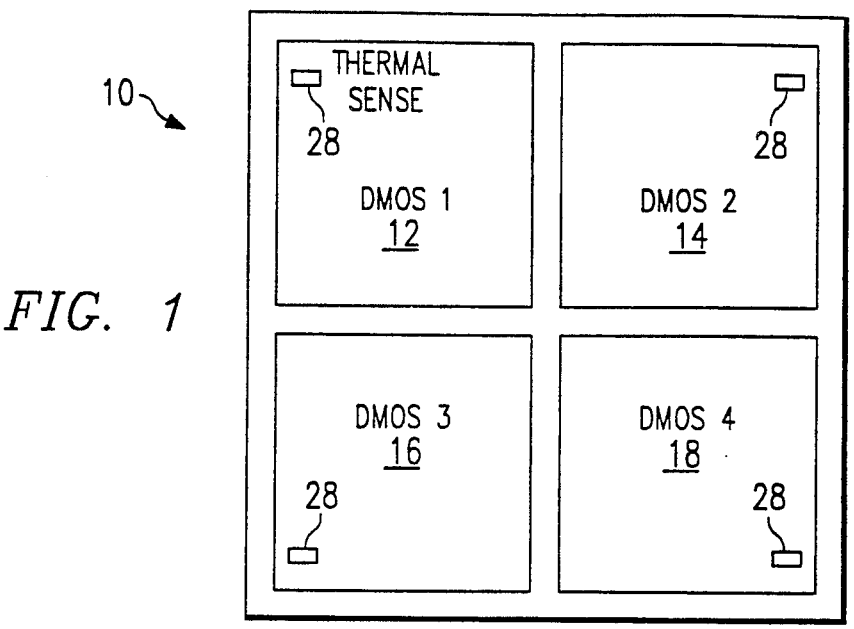
FIG. 1 provides a die plan of a quad-output DMOS power integrated circuit to show typical positioning of nominal independent thermal sensing of PIC device temperatures.
Figure 2:
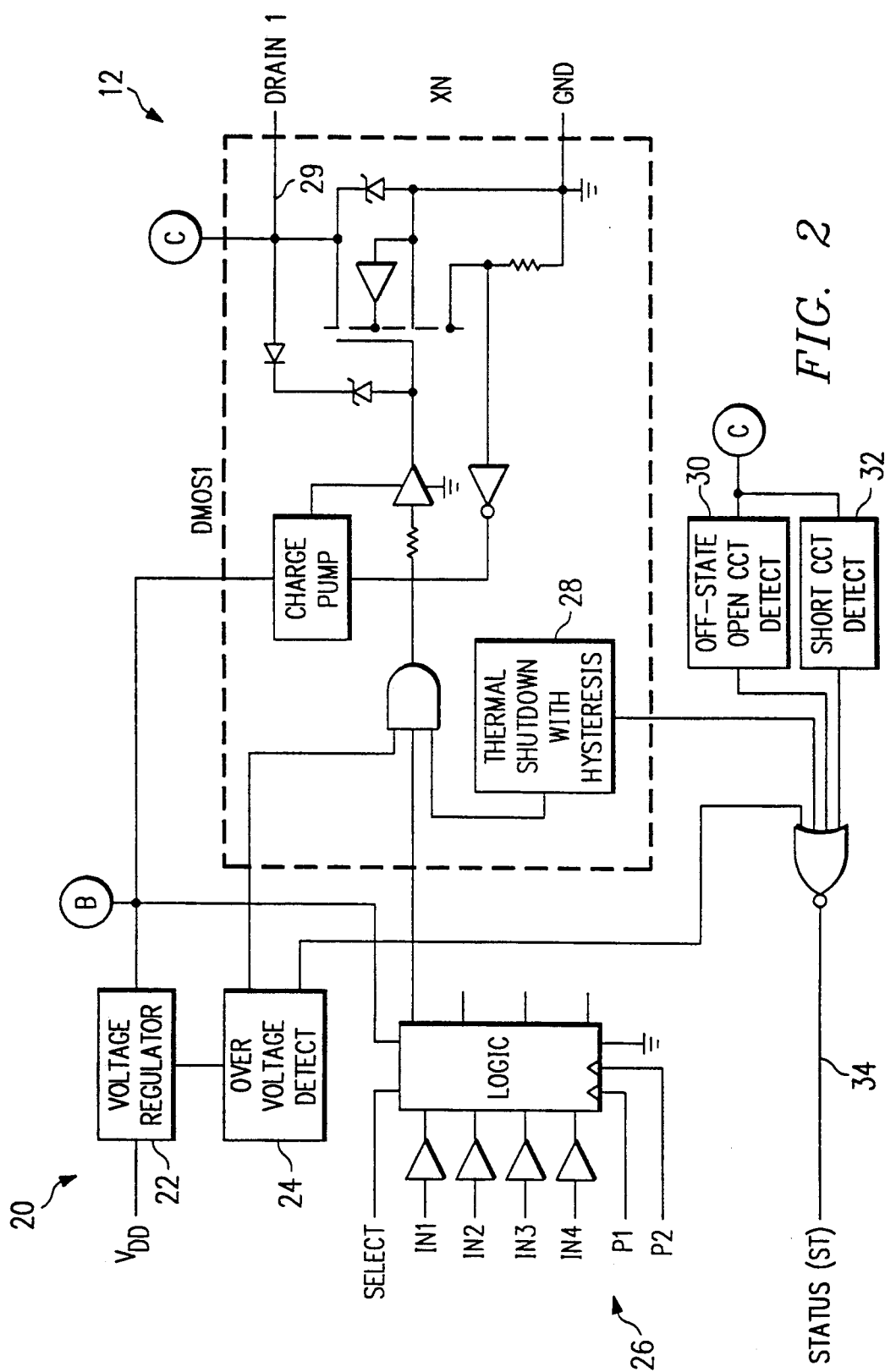
FIG. 2 provides a typical block schematic showing conventional thermal shutdown and hysteresis circuitry each output of the PIC device.

FIGS. 1 and 2 illustrate the common approach of many PIC chips that have multiple PIC devices. Referring to FIG. 1, PIC chip 10 includes multiple PIC devices 12, 14, 16, and 18. Each PIC device, such as PIC device 12, may be a DMOS output circuit such as DMOS1. Between the PIC devices 12, 14, 16 and 18 may be control circuitry 20 that regulates voltage supply and logic inputs to the PIC devices to control the PIC device operation. Within DMOS1 12 is thermal shutdown circuitry 28 that senses the temperature of DMOS1 and causes a thermal shutdown to occur in an over-temperature condition.

FIG. 2 shows a typical configuration of DMOS1 12 that provides a DC power output 29 to drive a DC load. For example, FIG. 2 shows that control circuitry 20 may include voltage regulator 22 having voltage detection circuitry 24. Control circuit 20 may also include logic circuitry 26 to control the operation of DMOS1 12, for example. The output of thermal shutdown circuitry 28 may combine with off-state open circuit detect circuitry 30 and short-circuit detect circuitry 32 to provide a status output 34 to indicate the status of DMOS1 12.

Figure 3:
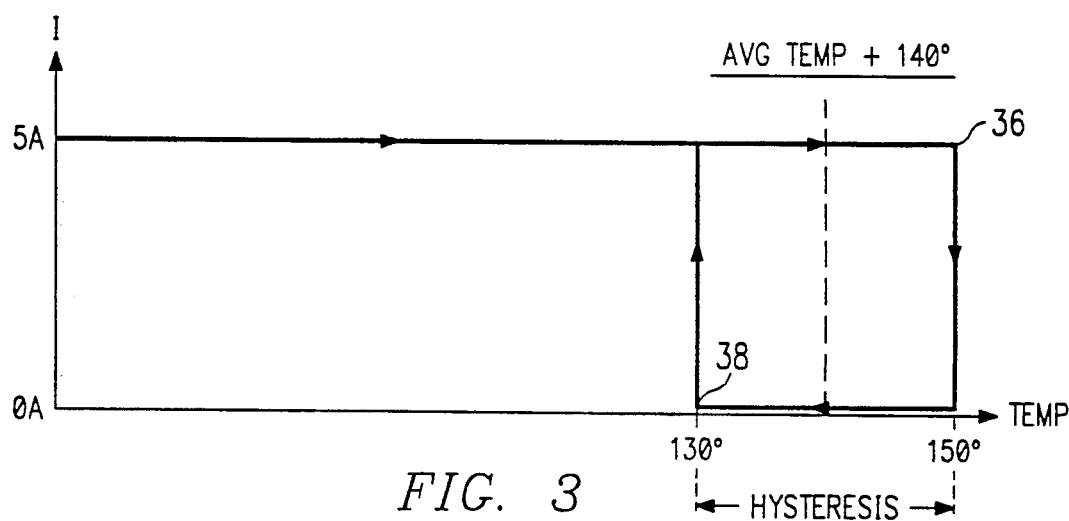
FIG. 3 shows a current/temperature/time graph typical of the hysteresis of a PIC device of the prior art.

If DMOS1 12 dissipates power at a higher than normal rate (e.g., as a result of short-circuit load), DMOS1 12 may heat up to a thermal shutdown temperature setpoint. Typically, the PIC device thermal shutdown setpoint may be 150° C. FIG. 3 shows the operation of DMOS1 when reaching thermal shutdown temperature setpoint 36 at the output current limit of 5 amps. Upon reaching setpoint 36, thermal shutdown circuitry 28 turns DMOS1 12 off until temperature falls to 130° C. At the lower setpoint 38, thermal shutdown circuitry 28 turns off and DMOS1 12 turns on again causing current to rise to the 5 amp output current limit and temperature to rise again to thermal shutdown temperature setpoint 36. With this hysteresis, the average temperature for DMOS1 will be approximately 140° C.

If one of the other DMOS outputs such as DMOS2 14, DMOS3 16, or DMOS4 18, is turned on, the normal power dissipation of any of these devices may be, for example 70° to 80° C. The dissipation of heat from the 140° C. average temperature of DMOS1 12 combined with the normal operating temperature of 70° to 80° for any of the adjacent PIC devices, may raise the temperature of the normally operating PIC device, such as DMOS2 14, DMOS3 16, or DMOS4 18, above its respective thermal shutdown temperature setpoint. As a result, this may activate the thermal shutdown circuitry in the otherwise normally function PIC device. The thermal shutdown with hysteresis circuit 28 for DMOS1 12 will permit output current to reach 5 amps again when the temperature falls to 130° C. Since, in this example, average temperature of DMOS1 12 is 140° C., the heat from DMOS1 12 radiating into DMOS2 14, DMOS3 16 or DMOS4 18 may increase their temperatures by over 100°. When this radiated temperature combines with the normal operating temperatures of the other DMOS outputs, it may not be possible for these other DMOS outputs to turn on again until DMOS1 12 output is turned off completely. Only at that point will PIC circuit 10 reduce sufficiently in temperature so that the normally operating PIC devices temperatures fall outside their respective hysteresis ranges.

Figure 4:
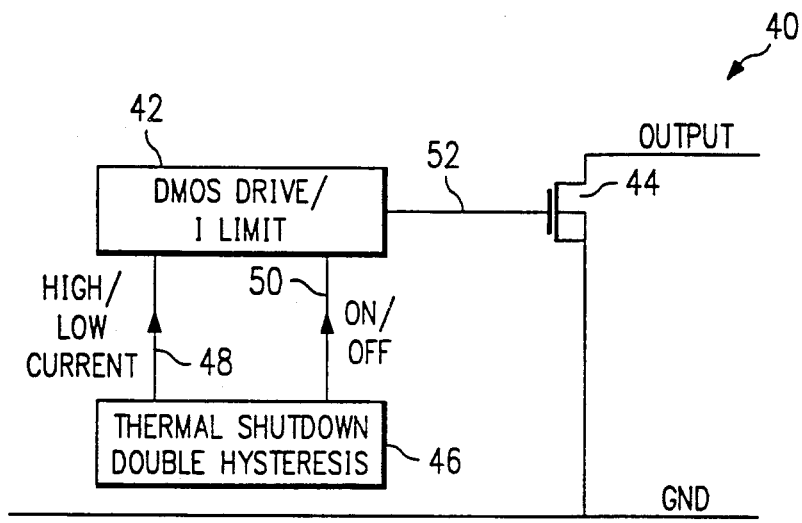
FIG. 4 provides a block schematic of the double thermal shutdown and hysteresis protection circuitry of the preferred embodiment.
Figure 5:
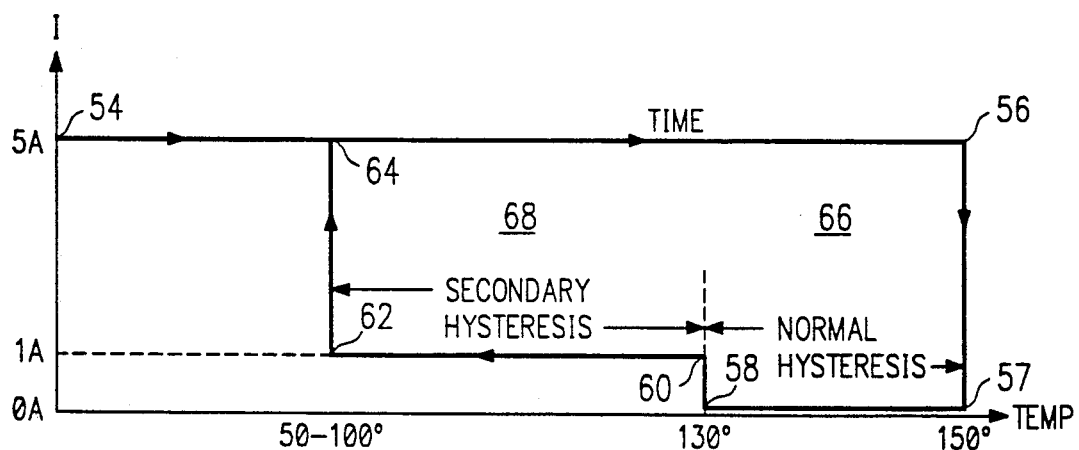
FIG. 5 illustrates the current/temperature/time graph showing the double hysteresis formed by the protection circuit of the preferred embodiment.

FIGS. 4 and 5 describe the preferred embodiment of the present invention. FIG. 4 provides a schematic block diagram of PIC device circuitry 40 that may connect within DMOS1 12 and include DMOS drive current circuitry 42 and double thermal shutdown and hysteresis circuit 46. DMOS drive current circuit 42 provides the DMOS drive current for output 44. Thermal shutdown and hysteresis circuit 46 provides high and low current control signal via line 48 and provides on/off signals through line 50. The functions of circuit 40 are essentially those of DMOS1 12, however, thermal shutdown with hysteresis circuit 46 provides a different current output according to the temperature of circuit 40.

FIG. 5 shows a current/temperature/time graph for PIC device circuitry 40. The graph begins with an initial current of 5 amps, as the output current limit. As power dissipates from PIC device 40, temperature increases with time until at point 56 a thermal shutdown with hysteresis occurs. At point 56, thermal shutdown with hysteresis circuit 46 switches current to the zero level indicated at point 57. Then, with no current passing through PIC device 40, the temperature drops to the normal hysteresis turn-on current setpoint 58. Then, in the preferred embodiment, instead of resuming output current to the output current limit of 5 amps, current increases to 1 amp at point 60. This allows a normal device to still turn on and operate normally, but limits the power dissipation from circuit 40 when a genuine short-circuit exists.

At point 60 and with current at the 1 amp level, a secondary hysteresis occurs. The secondary hysteresis causes temperature to decrease to a predetermined level, e.g., somewhere between 50° and 100° C., to a turn on point. Even more particularly, the temperature setpoint for the preferred embodiment may be 90° C., for example. At the predetermined temperature setpoint, output current again arises from 1 amp to the output current limit of 5 amps. This causes the temperature to increase to the normal hysteresis setpoint 56.

The double hysteresis method, i.e., normal hysteresis 66 and secondary hysteresis 68 of FIG. 5 provides the PIC device with some leeway for load and supply voltage variability, as well as initial transits as seen from resistive or capacitive loads. For example, consider if a PIC chip with four PIC devices, such as PIC chip 10 of FIG. 1, that is initially on a heat sink at, for example, 50° C., with the supply of 12 volts and a short-circuit on one of PIC chip loads. With an output current limit of 5 amps, each PIC device may produce 60 watts of power. A well heated-sinked PIC device may have a temperature generating capacity from junction to heat sink of 3° C. per watt. When just one output is short-circuited, this allows the PIC chip to ultimately reach a temperature approximately 230° C. without the thermal shutdown and hysteresis circuit 28.

A conventional thermal shutdown may oscillate between, for example, 130° and 150° C. as in FIG. 3. The double hysteresis scheme that FIG. 5 illustrates, however, instead of switching back to a 5 amp current limit, when the chip cools to 130° C., causes the circuit to switch to a one amp current limit state. With the 12 volt supply, for example, the power is limited to 12 watts total. This allows the PIC chip to cool further to approximately 86° C. (assuming a 3° C. per watt junction to heat sink temperature generating capability and a 50° heat sink).

At secondary hysteresis point 62, the current limit returns to its normal value. If the secondary hysteresis point is less than 86° C. the short-circuited PIC device will maintain the 86° C. temperature and not resume the 5 amp output current limit. On the other hand, if the secondary hysteresis setpoint exceeds 86° C., e.g., is 90° C., then thermal shutdown and hysteresis circuit 46 causes the PIC device to resume the 5 amp current limit. The PIC device will then heat up to 150° C. as FIG. 5 shows. With the setpoint at 90° C., the average temperature due to the short-circuit load will then be 120°. Both the 80° C. and the 120° C. average temperatures greatly reduce the problems of turn-off and remain-off that may occur in neighboring PIC devices on the common PIC chip.

Figure 7:
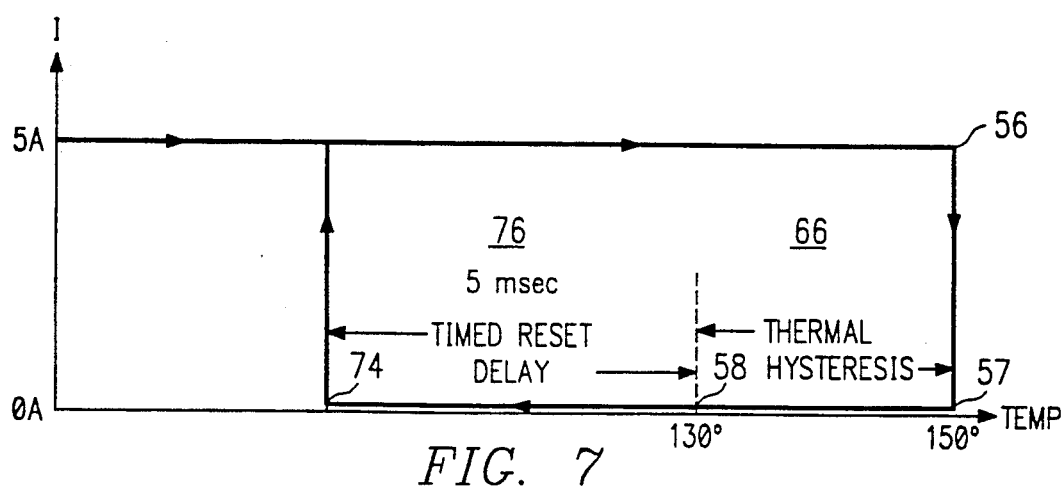
FIG. 7 illustrates the current/temperature/time graph of the thermal hysteresis that the alternative embodiment of the present invention provides.
Figure 6:
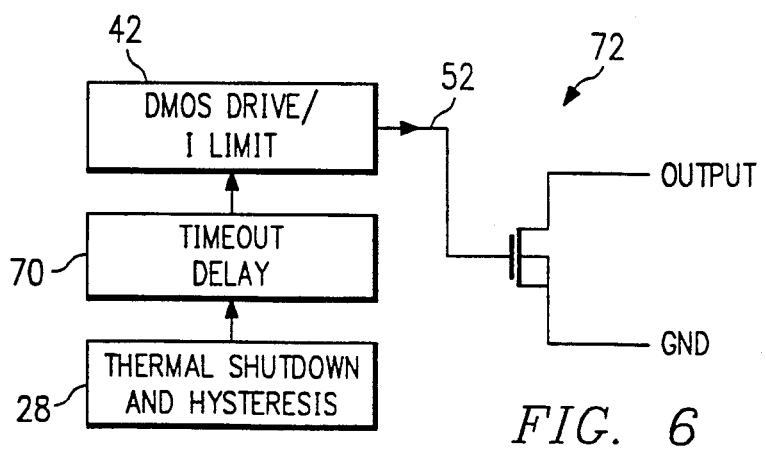
FIG. 6 provides a block schematic of a thermal hysteresis circuit with an additional time delay circuit for an alternative embodiment of the present invention.

FIGS. 6 and 7 illustrate an alternative embodiment of the present invention for activating a thermal trip when any one output exceeds a thermal limit value. Referring to FIG. 6, PIC device circuit 72 represents the possible circuitry for DMOS1 12 and includes DMOS drive current limit circuitry 42. DMOS drive circuitry 42 receives signals both from timeout delay circuitry 70 and thermal shutdown and hysteresis circuit 28. For purposes of the alternative embodiment, thermal shutdown with hysteresis circuitry 28 may be essentially the same circuitry as that of thermal shutdown with hysteresis circuitry 28 of FIG. 2. Instead of connecting directly to DMOS drive current limit circuitry 42, circuitry 28 of FIG. 7 connects indirectly through timeout delay circuitry 70.

FIG. 7 shows a current/temperature/time graph of the alternative double hysteresis that the circuitry of FIG. 7 yields. The double hysteresis of FIG. 7 begins at the 5 amp output current limit to cause a short-circuited PIC device such as DMOS1 12 to rise in temperature to the thermal shutdown temperature setpoint 56. At point 56, current goes to zero at point 57 and PIC device cooling occurs. At point 58, instead of resuming the 5 amp output current limit immediately, timeout delay circuitry 70 causes a time delay. The time delay causes PIC device temperature to lower further to point 74, at which time the output current level rises to 5 amps and in a short-circuited PIC device, heating to the thermal shutdown temperature setpoint 56 resumes.

The following example more particularly explains FIGS. 6 and 7. Suppose PIC device 12 exceeds 150° C., and the normal hysteresis 66 comes into effect. After cooling to 130° C. the failing PIC device does not return to its "on" condition immediately. Instead, timeout delay circuit 70 may prevent output current 52 from turning back on for approximately 5 milliseconds. As a result, the PIC device may reach a temperature of 80° C., for example.

From the lower 80° C. temperature of point 74, the output current resumes to 5 amps and the hysteresis resumes, causing temperature to reach the 150° C. thermal shutdown temperature setpoint 56. As a result of the combined effects of normal hysteresis 66 and time reset delay hysteresis 76 the PIC device operates at a lower average temperature. The lower average temperature thermally separates the short-circuit PIC device from the other PIC devices on the PIC chip. Thus, the timeout delay circuit 70 causes a result quite similar to the result of the double hysteresis circuit 46 of FIG. 4.

Although the invention has been described with reference to the above specified embodiments, this description is not meant to be construed in a limiting sense. Various modifications of the disclosed embodiment, as well as alternative embodiments of the invention will become apparent to persons skilled in the art upon reference to the above description. It is, therefore, contemplated that the appended claims will cover such modifications that fall within the true scope of the invention.

What is claimed is:

1. A method for thermally isolating a power integrated circuit device from a plurality of other such devices on a common power integrated circuit chip when the device reaches a thermal shutdown temperature setpoint with an output current at a predetermined current limit, comprising the steps of:
   (a) switching the output current to a shutdown current level until the device reaches a predetermined lower temperature setpoint;
   (b) restoring the output current to the predetermined limit only after the device reaches said predetermined lower temperature setpoint and a predetermined circuit setpoint, said circuit setpoint associated with the temperature of the device;
   (c) repeating steps (a) and (b) to lower the average temperature of the device and, thereby, reduce the internal interaction of the device from the plurality of other such devices on the common power integrated circuit chip.

2. The method of claim 1, wherein said restoring step comprises the step of the output current to the predetermined limit upon the power integrated circuit device reaching a yet lower temperature setpoint.

3. The method of claim 2, wherein said thermal shutdown temperature setpoint approximates 150° C. and said predetermined lower temperature setpoint approximates 130° C.

4. The method of claim 3, wherein said yet lower temperature setpoint comprises a 90° C. temperature setpoint.

5. The method of claim 2, further comprising the step of switching the output current to a level sufficiently high to drive a predetermined load, but sufficiently low to permit cooling of the power integrated circuit device.

6. The method of claim 5, wherein said low output current is 1 amp.

7. The method of claim 5, wherein said yet lower temperature setpoint is below the steady-state temperature of the power integrated circuit device operating at said low output current level.

8. The method of claim 5, wherein said yet lower temperature setpoint is above the steady-state temperature of the power integrated circuit device operating at said low output current level.

9. The method of claim 1, wherein said restoring step comprises the step of restoring said output current to the predetermined limit upon completing a time delay setpoint at said predetermined circuit setpoint for further cooling the power integrated circuit device.

10. The method of claim 9, wherein said time delay setpoint comprises a time delay of approximately between 5 milliseconds and 10 milliseconds.

11. The method of claim 1, wherein said plurality of power integrated circuit devices comprises a plurality of associated DMOS output circuits.

12. The method of claim 1, further comprising the steps of controlling said power integrated circuit devices through control circuitry on the power integrated circuit chip and receiving a status output indicating that the power integrated circuit device is executing a current-temperature hysteresis.

13. The method of claim 1, wherein said thermal shutdown temperature setpoint approximates 5 amps.

14. A power integrated circuit chip for thermally isolating a power integrated circuit device from a plurality of other such devices on the power integrated circuit chip when the power integrated circuit device reaches a thermal shutdown temperature setpoint with an output current at a predetermined current limit, comprising:
   a thermal shutdown circuit for sensing the power integrated circuit device temperature and switching the output current of the power integrated circuit device to a shutdown current level until the power integrated circuit device reaches a predetermined lower temperature setpoint;
   circuitry for restoring the output current to the predetermined current limit only after the power integrated circuit device reaches said predetermined lower temperature setpoint and a predetermined circuit setpoint, said predetermined circuit setpoint associated with the temperature of the device;
   circuitry for repeating the functions of said thermal shutdown circuit, and said restoring circuitry to continue operation of the power integrated circuit device to lower the average temperature of the power integrated circuit device and, thereby, reduce the thermal interaction of the power integrated circuit device from the plurality of other such devices on the power integrated circuit chip.

15. The apparatus of claim 14, further comprising a yet lower temperature setpoint and circuitry for sensing said yet lower temperature setpoint as said predetermined circuit setpoint.

16. The apparatus of claim 14, wherein said thermal shutdown temperature setpoint approximates 150° C. and said predetermined lower temperature setpoint approximates 130° C.

17. The apparatus of claim 16, wherein said lower temperature setpoint approximates 90° C.

18. The apparatus of claim 15, further comprising circuitry for switching the output current level to a level sufficiently high to drive a predetermined load, but sufficiently low to permit further cooling of the power integrated circuit device.

19. The apparatus of claim 14, wherein said predetermined current limit approximates 5 amps.

20. The apparatus of claim 19, wherein said lower output current level approximates 1 amp.

21. The apparatus of claim 19, wherein said yet lower temperature setpoint is below the steady-state temperature of the power integrated circuit device operating at said lower output current level.

22. The apparatus of claim 19, wherein said yet lower temperatures setpoint is above the steady state temperature of the power integrated circuit device operating at said lower output current level.

23. The apparatus of claim 14, wherein said power integrated circuit device comprises a DMOS output circuit.

24. The apparatus of claim 14, wherein said predetermined circuit setpoint comprises a time delay setpoint for further cooling the power integrated circuit device.

25. The apparatus of claim 24, wherein said time delay comprises a delay of approximately between 5 milliseconds and 10 milliseconds.

* * * * *